(12) United States Patent
Matsuo et al.

(10) Patent No.: US 10,594,139 B2
(45) Date of Patent: Mar. 17, 2020

(54) AUTONOMOUS STABLY-SUPPLYING TYPE RENEWABLE ENERGY CONTROL DEVICE

(71) Applicant: MATSUO CONSTRUCTION CO., LTD., Saga-shi, Saga (JP)

(72) Inventors: Tetsugo Matsuo, Saga (JP); Nobuhiro Fujiyoshi, Saga (JP); Koji Nakashima, Saga (JP); Toshiyuki Shima, Saga (JP)

(73) Assignee: MATSUO CONSTRUCTION CO., LTD., Saga-Shi (JP)

( * ) Notice: Subject to any disclaimer, the term of this patent is extended or adjusted under 35 U.S.C. 154(b) by 121 days.

(21) Appl. No.: 15/741,434

(22) PCT Filed: Jun. 15, 2016

(86) PCT No.: PCT/JP2016/067727
§ 371 (c)(1),
(2) Date: Jan. 2, 2018

(87) PCT Pub. No.: WO2017/010213
PCT Pub. Date: Jan. 19, 2017

(65) Prior Publication Data
US 2018/0375333 A1 Dec. 27, 2018

(30) Foreign Application Priority Data
Jul. 10, 2015 (JP) .................................. 2015-138336

(51) Int. Cl.
*H02J 3/38* (2006.01)
*H02J 3/48* (2006.01)
(Continued)

(52) U.S. Cl.
CPC ................ *H02J 3/382* (2013.01); *G05B 6/02* (2013.01); *H02J 3/383* (2013.01); *H02J 3/386* (2013.01);
(Continued)

(58) Field of Classification Search
CPC ........ H02J 3/382; H02J 13/0017; H02J 13/00; H02J 3/38; H02J 3/00; H02J 2003/003;
(Continued)

(56) References Cited

U.S. PATENT DOCUMENTS

| 8,471,520 B2 * | 6/2013 | Coe ........................ H02J 7/007 320/101 |
| 2012/0096844 A1 * | 4/2012 | Caldwell ............. F16H 61/4148 60/327 |

(Continued)

FOREIGN PATENT DOCUMENTS

| JP | 62-68023 A | 3/1987 |
| JP | 8-147055 A | 6/1996 |

(Continued)

*Primary Examiner* — Thomas C Lee
*Assistant Examiner* — Anzuman Sharmin
(74) *Attorney, Agent, or Firm* — Heedong Chae; Lucem, PC

(57) ABSTRACT

The present invention is provided with: a power converter (14) connected to a power plant (12) for generating power from renewable energy and having a proportional-control type power adjusting function that outputs the power generated by the power plant (12) after converting a direct current into an alternating current, and that adjusts the outputted power proportionally to a manipulation level; an instantaneous power detector (3) that detects an instantaneous power of the power outputted from the power converter (14); a comparison unit (4) that compares the instantaneous power detected by the instantaneous power detector (3) and a target value set by a generated power setting unit (5) and outputs a comparison signal; a control unit (6) that adjusts the comparison signal outputted by the comparison unit (4); and an output signal unit (7) that outputs the comparison signal adjusted by the control unit (6) to the power converter (14) as the manipulation level. Since the generated power setting unit (5) sets the target value on the (Continued)

basis of a power generation level setting value demanded by an information processing unit, the instantaneous power detected by the instantaneous power detector (3) is controlled to be the target value set by the generated power setting unit (5).

3 Claims, 4 Drawing Sheets

(51) Int. Cl.
*G05B 6/02* (2006.01)
*H02J 13/00* (2006.01)
*H02J 3/00* (2006.01)

(52) U.S. Cl.
CPC ............ *H02J 3/48* (2013.01); *H02J 13/0017* (2013.01); *H02J 13/0006* (2013.01); *H02J 2003/003* (2013.01); *Y02E 10/58* (2013.01); *Y02E 10/763* (2013.01); *Y02E 40/72* (2013.01); *Y02E 40/76* (2013.01); *Y04S 10/12* (2013.01); *Y04S 10/123* (2013.01); *Y04S 10/545* (2013.01)

(58) Field of Classification Search
CPC ........... G05B 6/02; Y02E 40/76; Y02E 40/72; Y02E 10/763; Y02E 10/58; Y04S 10/545; Y04S 10/123; Y04S 10/12

See application file for complete search history.

(56) References Cited

U.S. PATENT DOCUMENTS

| | | |
|---|---|---|
| 2012/0277930 A1 | 11/2012 | Ebata et al. |
| 2013/0123995 A1 | 5/2013 | Saito et al. |
| 2013/0162043 A1* | 6/2013 | Ellena ................. H02J 3/38 307/43 |
| 2013/0294119 A1 | 11/2013 | Kimura et al. |
| 2014/0049117 A1* | 2/2014 | Rahman ............... H02J 4/00 307/82 |
| 2016/0230699 A1* | 8/2016 | Bartlett ............... G05B 13/04 |

FOREIGN PATENT DOCUMENTS

| | | |
|---|---|---|
| JP | 2000-308264 A | 11/2000 |
| JP | 2011-193551 A | 9/2011 |
| JP | 2012-152058 A | 8/2012 |
| JP | 2013-108381 A | 5/2013 |
| JP | 5606645 B1 | 10/2014 |
| WO | WO 2011/111475 A1 | 9/2011 |
| WO | WO 2012/098769 A1 | 7/2012 |

* cited by examiner

AUTONOMOUS STABLY-SUPPLYING TYPE RENEWABLE ENERGY CONTROL DEVICE

TECHNICAL FIELD

The present invention relates to an autonomous stably-supplying type renewable energy control device. Specifically, the present invention relates to a power control technique, an energy saving technique, and a power transmission grid stabilizing technique involved in renewable energy power generation, such as photovoltaic power generation and wind power generation.

BACKGROUND ART

The Agency for Natural Resources and Energy and electric power companies in Japan decided to revise the renewable energy full-amount purchase system on November, 2014. The reasons and measures are as follows.

(1) In order to maintain operation with stable system interconnection (in voltage, frequency, and phase), it is necessary to suppress power generated from renewable energy to less than 50% of the value of instantaneous power generated (the instantaneous demand value from the perspective of the power consuming side).

(2) If this is not complied with and electric power companies' thermal power plants fail to cover an abrupt change in the power generated from renewable energy (an event such as stoppage of power generation) due to the weather condition and the like, the consequence can be a major power outage (blackout) over a wide area.

(3) According to "the Ministerial Ordinance and the Related Public Notices for Partially Revising the Ordinance for Enforcement of the Act on Special Measures Concerning Procurement of Electricity from Renewable Energy Sources by Electricity Utilities" by the Agency for Natural Resources and Energy, announced on Jan. 22, 2015, a trend of "unlimitedly generated power (which varies depending on the scale of the power generation)" seems to be inevitable for stabilization of power grids. This is leading to a slump in renewable energy power generation businesses based on private investment aiming to gain profits from selling generated power. However, this procedure seems unavoidable for stabilization of power grids. Further, this notice states that "it is essential for Japan to introduce a more effective and meticulous output-control scheme so as to successfully introduce renewable energy per kWh to the maximum extent possible".

Because of this, solar panel manufacturers have been demanded to newly provide output limiting functions and attempting to develop techniques by the end of fiscal year 2015.

Thus, the situation is that new businesses are practically difficult to establish until these conditions are met.

(4) The Agency for Natural Resources and Energy and electric power companies have authorized resumption of businesses on condition that past calendar information (non-business days and holidays in summer time) is stored on a server and the power producer accepts performing output suppression based on scheduled (predictive) control (entirely at the power producer's expense).

In this case, however, the output suppression is performed even on the actual day where the output suppression is not necessary since it is based on past weather information. This is disadvantageous economically and in view of $CO_2$ reduction and has drastically reduced power producers planning to go into the business again even by satisfying these strict conditions.

(5) Despite this situation, Japan has announced a proposed policy to increase the proportion of renewable energy such that the proportion will be twice (20%) greater the current one by around 2025. However, due to the above-described conflict, there has been a demand for new techniques.

Meanwhile, Patent Document 1 is a target value setting type demand power proportional control device for smoothly controlling power for a load side (power consuming side) for air conditioning in order to stabilize a power grid. The device outputs a control signal for controlling the power consumption of all loads to a target value, only to air conditioners including exhaust equipment, which are automatically controllable loads. This offers the advantage that it is possible to avoid decrease in production efficiency of production machines, which are not included in the automatically controllable loads, and also to freely control the power consumption of the business facility toward any target value.

PRIOR ART DOCUMENT

Patent Document

Patent Document 1: Japanese Patent No. 5606645

SUMMARY OF THE INVENTION

Problems to be Solved by the Invention

To comply with the notice announced on Jan. 22, 2015 by the Agency for Natural Resources and Energy, electric power companies and manufacturers have been trying to develop and commercialize power generators that can be powered on and off through remote control using prediction-type schedule management based on past calendar information.

In such a method of forcibly powering on and off a power generator based on calendar information, renewable energy power generation must be stopped even on a day where the weather is not clear and sunny contrary to the prediction but power generation is somewhat possible. This is uneconomical and lowers the contribution to $CO_2$ reduction as well.

Such a power generation suppression method currently actively studied is what is called a calendar method in which the renewable energy power generation is stopped on non-business days and holidays by predicting that the power load on the system will be less than the amount of power generated from the renewable energy on these days based on calendar information such as the system power conditions and the amount of insolation in the past.

Thus, the renewable energy power generation will be stopped if the amount of power (generated from the renewable energy) flowing into the power distribution system is predicted to be excessively large.

However, the renewable energy power generation will be suppressed even if the sun does not shine (the weather condition does not change) much contrary to the prediction by the calendar method based on the past information. This will result in a disadvantageous situation economically and in view of $CO_2$ reduction, because the shortfall in power will be covered by thermal power generation.

Specifically, as illustrated in FIG. 2, a power producer obligated to receive through a network (such as a wired LAN or a wireless LAN) a power generation suppression command 23 based on calendar information (calendar schedule) 20 stored on a server or the like on the Web by a major electric power company obligated to ensure stable system interconnection must have staff 21 such as personnel in charge of electrical safety rewrite power generation parameters (power generation ability commands) of power conditioners (PCSs) 14 by using an apparatus 22 such as a personal computer.

This means to manually rewrite the parameters of a plurality of power conditioners 14 present in renewable energy power generation plants installed in several tens of thousands of locations in Japan alone, which is a significant burden in terms of time and cost.

Meanwhile, the power conditioners 14 are power converters that convert generated power from DC power into AC power, and are respectively connected to solar panels 12, which are photovoltaic power generation installations.

To improve these problematic points, the present invention provides an autonomous stably-supplying type renewable energy control device capable of economically and stably introducing renewable energy while ensuring stabilization of a power grid.

Note that the present invention clearly differs from Patent Document 1, which smoothly controls power for a load side (power consuming side) for air conditioning in order to stabilize a power grid, in that the present invention smoothly controls power generated from renewable energy by a power supplying side.

By using the present invention, the autonomous stably-supplying type renewable energy control device, installed in a power plant, can freely suppress the amount of power generation according to a command with a power generation amount setting value (0 to 100%) from the Web or the like. Moreover, the autonomous stably-supplying type renewable energy control device can maintain stable power generation even if the amount of power generation changes due to a change in the weather condition (even if the amount of power generation increases or decreases from a predicted amount).

Here, a voltage suppression circuit (not illustrated) installed at a PCS power outlet 15 inside each PCS 14 by the PCS manufacturer controls the output to 210 V. In practice, however, the output is set to be higher than 210 V in order to prevent the decrease in delivered power due to the voltage drop at each low-voltage side power transmission line 16 to a transformer 13 that converts 210 V at the PCS into 6600 V and the winding ratio of and voltage drop at the transformer 13, as well as the voltage drops at a high-voltage power transmission line 17 from the transformer 13 to an instantaneous power detector 3 and a high-voltage power transmission line 18 from the instantaneous power detector 3 to a voltage-phase-frequency detector 2. For this reason, the consequence is that the accurate power transmission grid voltage cannot always be guaranteed. To solve this problem, the present invention performs control with management of quality such as the voltage and phase at the power transmission point on the very terminal side, which are accurate, and therefore remarkably improves accuracy and reliability. Moreover, the present invention eliminates the need for changing settings of a plurality of PCSs by only manipulating settings for the to-be-generated power on site. Furthermore, the present invention can perform control of the entire power generated from the renewable energy required by the system side by using wired signals or wireless signals from the system interconnection side and remote manipulation of the to-be-generated power through the Web. Hence, the present invention can greatly contribute to $CO_2$ reduction with renewable energy, which has been expected to be effectively utilized in the future on a global scale, and to stabilization of power grids.

Means for Solving the Problems

An autonomous stably-supplying type renewable energy control device according to a first aspect of the present invention to solve the problem above includes one or more power converters connected respectively to one or more power generation installations that generate power from renewable energy, and having a proportional-control type power adjusting function that converts the power generated by the respective power generation installations from DC power into AC power and outputs the resultant power while adjusting the power to be outputted in proportion to a manipulation amount, an instantaneous power detector that detects instantaneous power of the power outputted from the power converters, a comparison unit that compares the instantaneous power detected by the instantaneous power detector and a target value set by a to-be-generated power setting unit and outputs a comparison signal, a control unit that adjusts the comparison signal outputted by the comparison unit, and an output signal unit that outputs the comparison signal adjusted by the control unit to the power converters as the manipulation amount, in which the to-be-generated power setting unit sets the target value based on a power generation amount setting value calculated by an information processing unit, and the information processing unit sets the power generation amount setting value such that the power to be outputted from the power converters is greater than the a predicted power load but less than an actual power load when the actual power load is greater than the predicted power load, the predicted power load being a load predicted based on calendar information on a past power demand, the actual power load being a load that varies depending on actual weather information and a system voltage, phase, and frequency on an actual day.

In the autonomous stably-supplying type renewable energy control device according to the first aspect, an autonomous stably-supplying type renewable energy control device according to a second aspect of the present invention to solve the problem above is characterized in that an instrumentation standard signal is used for the instantaneous power detected by the instantaneous power detector, the target value set by the to-be-generated power setting unit, and the comparison signal outputted by the comparison unit.

In the autonomous stably-supplying type renewable energy control device according to the first aspect, an autonomous stably-supplying type renewable energy control device according to a third aspect of the present invention to solve the problem above is characterized in that the calendar information is stored on the Web.

EFFECTS OF THE INVENTION

According to the present invention, power generated by the power generation installations is converted from DC power into AC power by the respective power converters and outputted, the instantaneous power of the power outputted from the power converters is detected, the detected instantaneous power and a target value are compared to obtain a comparison signal, the comparison signal is adjusted such that the detected instantaneous power will be close to the target value and is outputted to the power converters as a manipulation amount, and the output power is controlled in proportion to the manipulation amount by the proportional-control type power adjusting function of the power converters. This offers the advantage of being capable of freely controlling power generated from the renewable energy, which has been commonly considered unstable.

Also, by setting a target value (output setting value), changes in weather (amount of insolation) up to a certain level can be absorbed. This makes it possible to construct renewable energy power generation equipment that is safe, friendly, and stable for the system interconnection side.

In other words, by reducing the maximum amount of power generation with the target value (output setting value), changes (unstableness) in amount of power generated from the renewable energy due to changes in weather can be absorbed to some extent.

Hence, the present invention enables renewable energy power generation that is capable of more stable operation, more nature-friendly, and contributes more to stabilization of power grids than the conventional renewable energy power generation with power generation equipment that is difficult to handle.

Moreover, the present invention can be positioned as a technique that is effective economically and in view of CO2 reduction since it performs automatic power generation within the extent that the system interconnection can be ensured, even under the country' and electric power companies' policy to perform output suppression based on calendar information in the future.

In other words, the present invention can implement equipment for power generation that is more stable than and superior to the conventional renewable energy power generation, which is affected by small changes in weather (clouds and shades) due to calendar information.

In particular, the present invention can contribute to stabilization of power distribution grids by having the function of detecting an excess of power (the same applies to the system voltage, phase, and frequency) and automatically suppressing the output.

The power converters may have an ON-OFF actuation-stop function allowing them to be actuated or stopped with an ON or off signal, instead of the proportional-control type power adjusting function. In this case, the output power can be simply controlled by outputting an ON or OFF signal from the output signal unit, instead of the manipulation amount, to each power converter to actuate only power converters corresponding in number to the comparison signal while stopping the remaining power converters.

MODES FOR CARRYING OUT THE INVENTION

Figure 1:
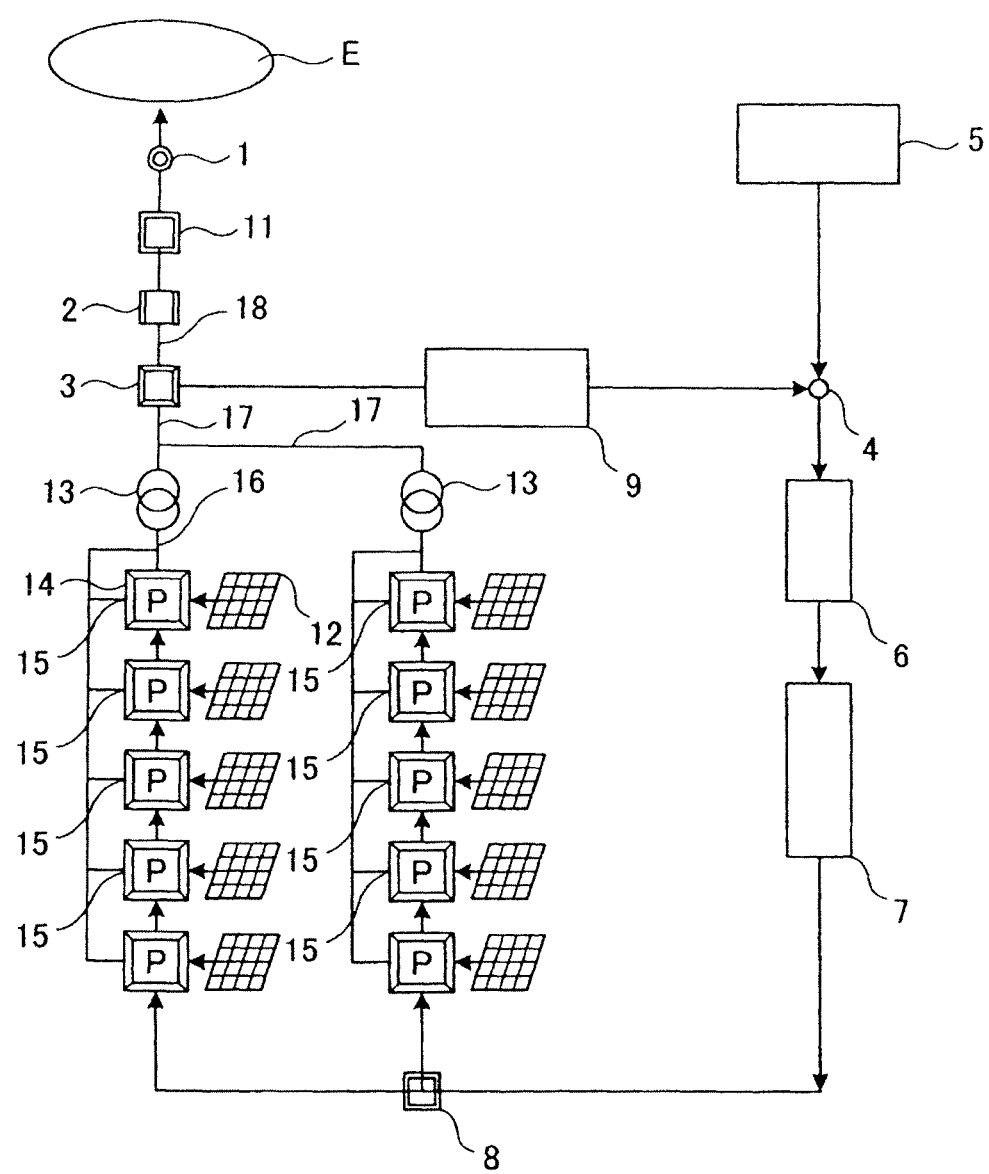
FIG. 1 is a schematic configuration diagram of an autonomous stably-supplying type renewable energy control device according to a first embodiment of the present invention.
Figure 2:
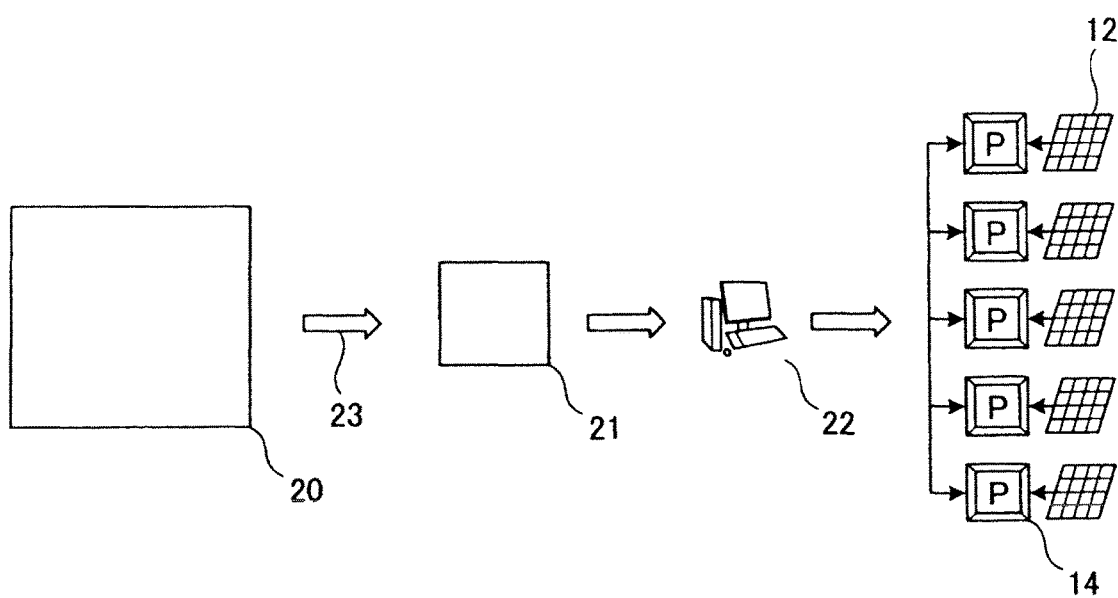
FIG. 2 is a schematic configuration diagram of a renewable energy control device with a power generation suppression method (calendar method) which has been currently actively studied.

An autonomous stably-supplying type renewable energy control device of the present invention will be described below in detail with reference to embodiments illustrated in the drawings.

Embodiment 1

FIG. 1 illustrates an autonomous stably-supplying type renewable energy control device according to a first embodiment of the present invention.

The present invention solves problems with conventional renewable energy power generation, which has been recognized as power generation in which power to be generated is affected by natural conditions and therefore not stable, with the following methods to implement stable power generation equipment.

Specifically, in the embodiment illustrated in FIG. 1, generated power generated by a photovoltaic power generation installation including a plurality of solar panels 12 is transmitted from a power transmission point 1 to a power grid of an external major electric power company E or the like through power conditioners (PCSs) 14 and the like while system interconnection is established.

The solar panels 12 are photovoltaic power generation installations that generate power from solar light, which is a renewable energy, and 10 solar panels 12 are illustrated in the figure.

In this embodiment, the maximum amount of power generation of each solar panel 12 is 200 kw, and the total maximum amount of power generation is 2000 kw. The present invention is applicable also to wind power generators and the like besides photovoltaic power generation installations. The output control in wind power generation includes control of the angle of vanes called blades to the direction of wind and DC-AC converter control that first converts generated power into DC power and then converts it into AC power. These methods of controlling the output power through control of the amount of power generation and the amount of conversion are substantially the same as the control of power generation from renewable energy such as solar light.

The power conditioners 14, which are power converters that convert generated power from DC power into AC power and then output it, are connected respectively to the solar panels 12.

As will be described later, these power conditioners 14 have a proportional-control type power adjusting function that adjusts the output power in proportion to a manipulation amount. The power conditioners are also called DC-AC inverters.

A transformer 13, an instantaneous power detector (for the effective and apparent values and the power factor) 3, a voltage-phase-frequency detector 2, and a generated power meter 11 are interposed in this order between the power conditioners 14 and the power transmission point 1.

With this entire generated power feedback control function, even if some of the power conditioners 14 malfunctions and suffers a decline in performance, the remaining good power conditioners 14 can be effectively utilized. This provides the advantage that the performance as a whole is guaranteed and the output power is therefore stable.

The instantaneous power detector 3 detects the instantaneous power (the effective and apparent values and the power factor) of the power outputted from the power conditioners 14 and outputs it to a comparison unit 4 as an internationally uniform instrumentation standard signal (hereinafter, referred to simply as a/the standard signal).

Figure 5:
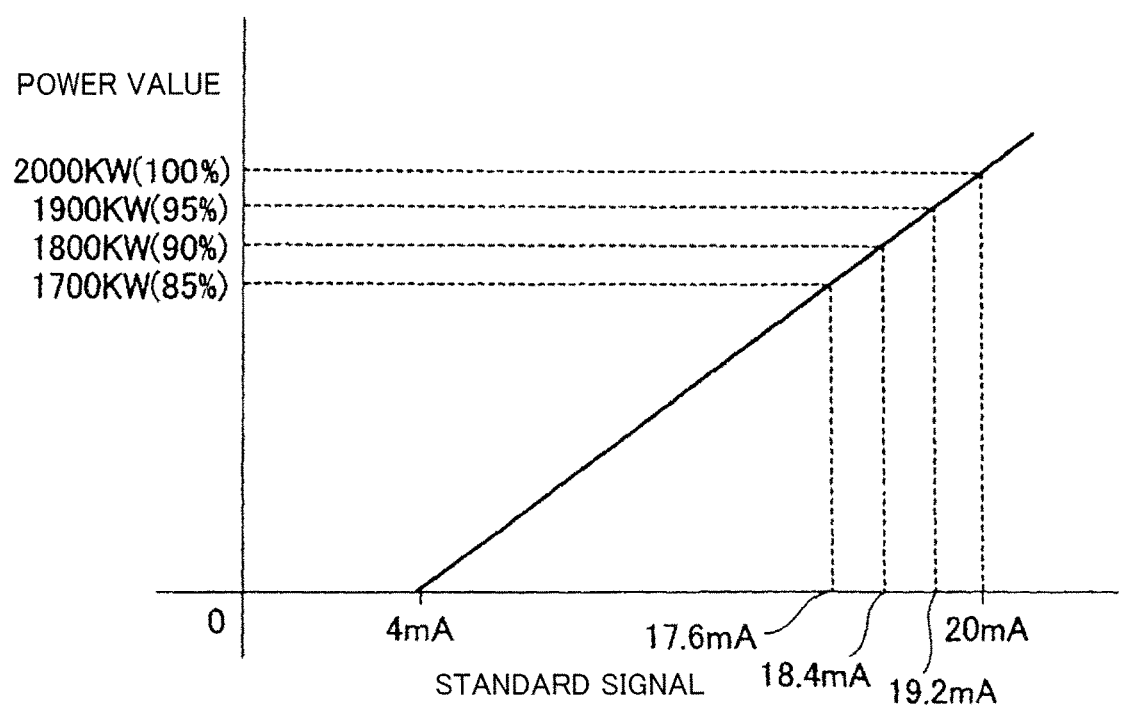
FIG. 5 is a graph illustrating power values versus standard signals.

As the standard signal, typically used is, for example, a DC analog signal (DC 4 to 20 mA or 1 to 5 V) that linearly varies with the instantaneous power (kW) such that the DC analog signal is 20 mA when the instantaneous power is 2000 kw (100%) and the DC analog signal is 4 mA when the instantaneous power is 0 kw (0%), as illustrated in FIG. 5.

However, the standard signal is not limited to such a DC analog signal but various kinds of digital signals equivalent to this may be used.

Although analog control using the DC analog signal (DC 4 to 20 mA) will be described in the following embodiments, the essence of the control remains the same regardless of whether the control is analog or digital.

A temporary delay converter 9 is interposed between the instantaneous power detector 3 and the comparison unit 4.

The temporary delay converter 9 has the function of a filter that converts a waveform varying in a zigzag manner with time due to a temporary delay into a smooth waveform.

A to-be-generated power setting unit 5 is connected to the comparison unit 4, and a target value set by the to-be-generated power setting unit 5 is outputted to the comparison unit 4. The standard signal is used also for the target value set by the to-be-generated power setting unit 5.

The comparison unit 4 compares the instantaneous power detected by the instantaneous power detector 3 and the target value set by the to-be-generated power setting unit 5 as standard signals and outputs a comparison signal to a control unit 6.

For example, as illustrated in FIG. 5, when the instantaneous power detected by the instantaneous power detector 3 is 1900 kw (95%), the standard signal outputted as the instantaneous power from the instantaneous power detector 3 is (1900 kw/2000 kw)×(20 mA−4 mA)+4 mA=19.2 mA.

Assume, on the other hand, that the standard signal set as the target value by the to-be-generated power setting unit 5 is 18.4 mA, for example. In other words, as a function that reduces the maximum value by 10%, the target value represents a maximum amount of power generation of 2000 kw×(18.4 mA−4 mA)/16 mA=1800 kw (90%).

Consequently, the comparison unit 4 calculates the difference of the instantaneous power from the target value and outputs (18.4 mA−19.2 mA)=−0.8 mA as the comparison signal.

With the comparison signal, it is possible to evaluate how much the power generated by the solar panels 12 is greater or less than the target value. Meanwhile, the comparison signal is eventually a standard signal as well.

The control unit 6 performs various kinds of adjustment that have been conventionally well known in the field of instrumentation based on the comparison signal outputted from the comparison unit 4 such that, in the above example, the instantaneous power detected by the instantaneous power detection unit 3 will be close to the target value set by the target value setting unit 5, in other words, the standard signal as the instantaneous power detected by the instantaneous power detection unit 3 will be close to the target value of 18.4 mA from its current value of 19.2 mA. Then, the resultant comparison value is outputted as a manipulation amount from an output signal unit 7 to the power conditioner 14.

Assume, for example, that the power to be generated by the solar panels 12 has been adjusted to an instantaneous power of 1900 kw (=95%) with the current manipulation amount by the proportional-control type power adjusting function of the power conditioners 14.

In this case, the current manipulation amount is changed by {(18.4 mA−19.2 mA)/(19.2 mA−4 mA)}≅−5.3% in order that 19.2 mA, which is the current value of the standard signal as the instantaneous power detected by the instantaneous power detection unit 3, can be the target value of 18.4 mA. That is, a new manipulation amount which is approximately 94.7% (≅100%−5.3%) of the current manipulation amount, is outputted to the power conditioners 14.

As a result of giving the new manipulation amount, which is approximately 94.7% of the current manipulation amount, to the power conditioners 14 as above, approximately 94.7% of the current power will be outputted as power by the proportional-control type power adjusting function. In other words, the power generated by the solar panels 12 will be adjusted to an instantaneous power of 1900 kw×94.7%≅1800 kw (=90%).

Consequently, the standard signal detected as an instantaneous power of 1800 kw by the instantaneous power detector 3 is (1800 kw/2000 kw)×16 mA+4 mA≅18.4 mA, that is, a value close to the target value of 18.4 mA.

Also, even if the weather condition (amount of insolation) changes, stable renewable energy power generation will be possible by setting the target value (18.4 mA) via the above-described negative feedback control so that 1800 kw (=90%), which is somewhat less than the maximum amount of power generation of 2000 kw, can be generated.

For example, when the weather is cloudy, the instantaneous power detected by the instantaneous power detection unit 3 can be 1700 kw (85%). In this case, the standard signal outputted as the instantaneous power from the instantaneous power detector 3 is (1700 kw/2000 kw)×(20 mA−4 mA)+4 mA=17.6 mA.

Assume, on the other hand, that the standard signal set as the target value by the to-be-generated power setting unit 5 is 18.4 mA, which is 1800 kw (90%), as in the above-described example.

The comparison unit 4 calculates the difference of the instantaneous power from the target value and outputs (18.4 mA−17.6 mA)=0.8 mA as the comparison signal.

Based on the comparison signal outputted from the comparison unit 4, the control unit 6 changes the current manipulation amount by, for example, {(18.4 mA−17.6 mA)/(17.6 mA−4 mA)}≅5.8% so that the standard signal as the instantaneous power detected by the instantaneous power detection unit 3 will be close to the target value of 18.4 mA from its current value of 17.6 mA. In other words, a new manipulation amount which is approximately 105.8% (≅100%+5.8%) of the current manipulation amount is outputted to the power conditioners 14.

As a result of giving the new manipulation amount, which is approximately 105.8% of the current manipulation amount, to the power conditioners 14 as above, approximately 105.8% of the current power will be outputted as power by the proportional-control type power adjusting function. In other words, the power generated by the solar panels 12 will be adjusted to an instantaneous power of 1700 kw×105.8%≅1800 kw (=90%).

Meanwhile, in this embodiment, the manipulation amount outputted from the output signal unit 7 is outputted to the power conditioners 14 through an output signal converter 8.

This output signal converter 8 is a device that converts the manipulation amount into a manipulation amount acceptable by the power conditioners 14 and then outputs it to the power conditioners 14 since the manipulation amount acceptable by the power conditioners 14 differs from one manufacturer to another.

Here, if the power conditioners 14 can accept the standard signal as a manipulation amount, the output signal converter 8 can be omitted, and the manipulation amount outputted from the output signal unit 7 to the power conditioners 14 can be the standard signal.

In other words, the standard signal can be used by all of the instantaneous power detector 3, the to-be-generated power setting unit 5, the comparison unit 4, the control unit 6, and the output signal unit 7.

The to-be-generated power setting unit 5 will be described more specifically with reference to FIG. 3.

Figure 3:
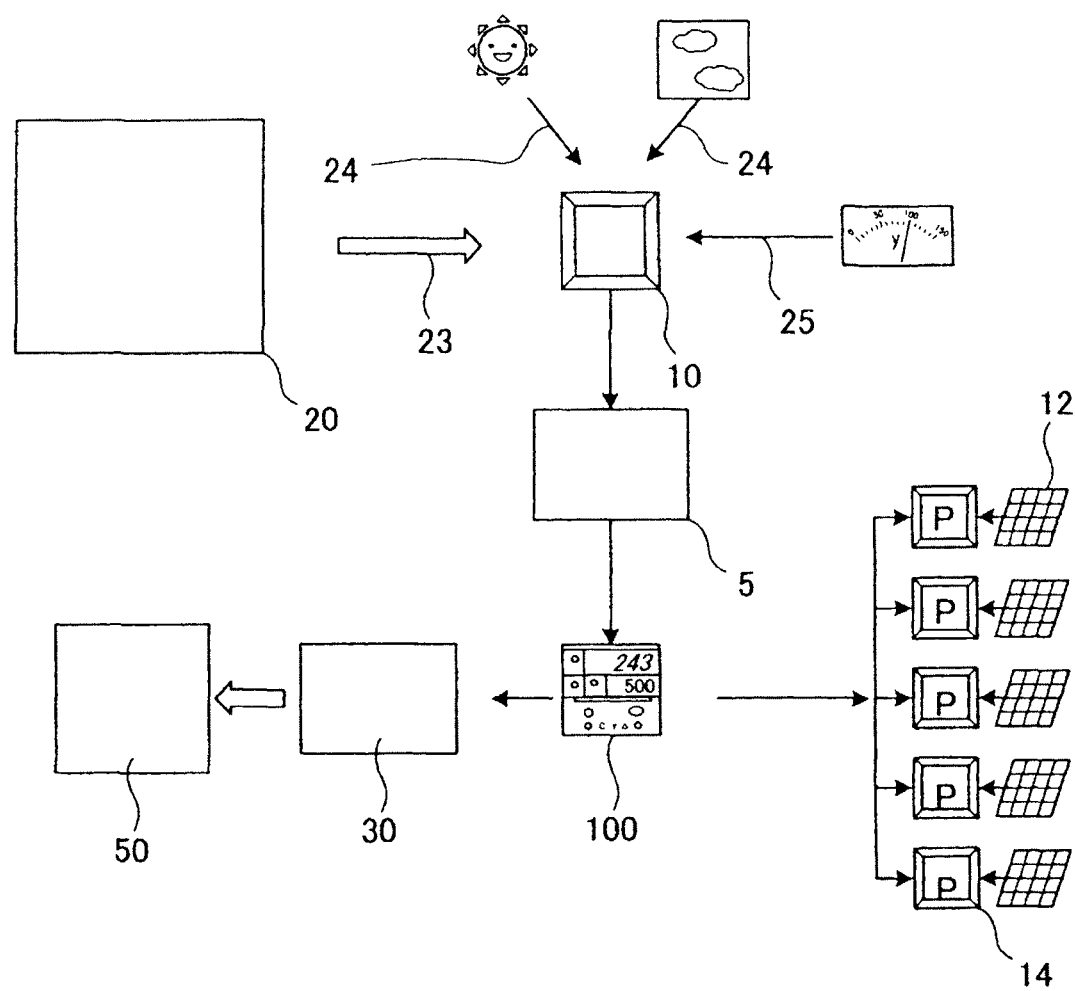
FIG. 3 is a block diagram illustrating a specific configuration related to a to-be-generated power setting unit.

As illustrated in FIG. 3, the to-be-generated power setting unit 5 sets a target value based on a power generation amount setting value calculated by an information processing unit 10. Based on the set target value, a manipulation amount is outputted through a control system 100 to the power conditioners 14 to control the power to be generated by the solar panels 12. On the other hand, necessary information is provided through a to-be-generated power reporting function 30 to an electric power company system administrator 50. The control system 100 is a collective term for the comparison unit 4, the control unit 6, and the output signal unit 7 in FIG. 1.

Here, as illustrated in FIG. 3, the information processing unit 10 receives a power generation suppression command 23 based on calendar information 20 on past power demands, weather information 24, and system voltage-phase-frequency information 25.

Calendar information 20 on past power demands refers to information on the system power conditions, the amount of insolation, etc. in past calendars. The power generation suppression command based on the calendar information 20 refers to a command to suppress the renewable energy power generation upon predicting that the power load on the system will be less than the amount of power generated from the renewable energy. The calendar information 20 can be stored on the Web.

The weather information 24 refers mainly to the amount of insolation on the actual day in the case of photovoltaic power generation, and to information on the speed, flow rate, direction, etc. of wind in the case of wind power generation.

The system voltage-phase-frequency information 25 refers to information on the system voltage, phase, and frequency detected by the voltage phase-frequency detector 2.

The information processing unit 10 performs arithmetic processing based on these kinds of information and outputs a power generation amount setting value (e.g. 80 to 90%) to the to-be-generated power setting unit 5.

General Electricity Utilities (10 electric power companies including TEPCO) are obligated to stabilize the voltage at the power distribution point 1 within a certain range (101±6 V: 95 V to 107 V in terms of values on a single-phase 100 V side). In order to comply with this, a measure has been taken which involves suppressing the amount of instantaneous power generated by renewable energy power generation in which the amount of power generated is greatly variable (mainly photovoltaic power generation and wind power generation) to less than 50% of the entire amount of power generation (or demand value). As part of this measure, stopping the renewable energy power generation is a framework for renewable energy businesses this time (see the notice announced on Jan. 22, 2015). The situation is, however, that renewable energy business operators must prepare equipment for this at their expense. Moreover, due to these reasons, the amount of power to be sold is uncertain, making it difficult to ensure a profit and difficult to establish business plans in the first place.

In view of these circumstances, the information processing unit 10 calculates a power generation setting value such that the power to be generated will be limited autonomously (automatically) when the value detected by the voltage-phase-frequency detector 2 exceeds a tolerable value. In this way, the electric power company can control the power to be generated without spending a large amount of money. In other words, the renewable energy business operator can simplify the monitoring of the power.

As described above, the information processing unit 10 calculates the power generation amount setting value such that the power generation will be suppressed when the system voltage detected by the voltage-phase-frequency detector 2 is a voltage equal to or greater than a certain value, that is, when there is an excess of power.

On the other hand, the information processing unit 10 calculates the power generation amount setting value such that the power generation will not be suppressed when the system voltage detected by the voltage-phase-frequency detector 2 is equal to or less than a certain voltage. Although the above example has been described regarding voltage, the same applies to the phase and frequency of the power to be generated.

Specifically, a large power generation amount setting value is set regardless of the power generation suppression command if the amount of insolation is not much on the actual day according to the weather information 24 and the renewable energy power generation neither need to be suppressed according to the voltage-phase-frequency information 25 contrary to the prediction based on the calendar information 20 on the past power demands.

The magnitude of the power generation amount setting value is set as follows.

In the calendar method, on, for example, non-business days and holidays, the power generation on the renewable energy side is stopped since the renewable energy side is requested to suppress the power generation due to a prediction that an excessive amount of power (from the renewable energy) flows into the distribution system on these days.

In this case, in the conventional method, the power generation is suppressed even if the sun does not shine much contrary to the prediction based on the calendar information (based on past data). This is disadvantageous economically and in $CO_2$ reduction.

In contrast, in the present invention, a large power generation amount setting value is set if it is determined that the power generation is possible based on detection of the weather information (the amount of insolation in particular) and the system voltage, frequency, and phase on the actual day. In this way, generated power 43 outputted from the power transmission point 1 through the power conditioners 14 (hereinafter, referred to as the generated power controlled by the present invention) can be controlled automatically, as described below. This is advantageous economically and in $CO_2$ reduction.

Figure 4:
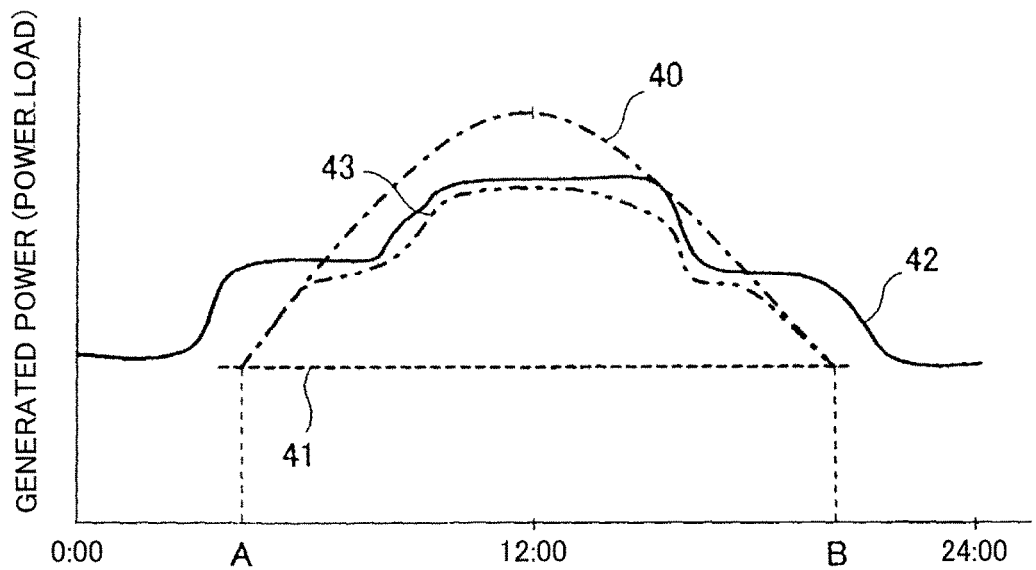
FIG. 4 is a graph illustrating relations of generated power controlled by the present invention with renewable energy generated power without power generation suppression, a power load (covered by renewable energy) predicted based on calendar information, and an actual power load (demand).

FIG. 4 illustrates relations of the generated power 43, controlled by the present invention, with renewable energy generated power 40 without power generation suppression, an amount of generated power (from the renewable energy) 41 with predicted suppression based on the calendar information, and an actual power load (demand) 42.

As indicated by the dashed-dotted line in FIG. 4, the renewable energy-generated power 40 without power generation suppression increases in the morning, peaks substantially at noon, and gradually decreases in the afternoon. On the other hand, as indicated by the dashed line in the figure, the amount of generated power (from the renewable energy) 41 with the predicted suppression based on the calendar information remains fixed all day, for example.

Thus, as illustrated in FIG. 4, the renewable energy generated power 40 is greater than the amount of generated power (from the renewable energy) 41, predicted based on the calendar information, from a time A in the morning to a time B in the afternoon. In other words, the renewable energy generated power 40 is predicted to be an excess of power relative to the amount of generated power (from the renewable energy) 41.

For this reason, in the conventional method, the renewable energy power generation is stopped from the time A in the morning to the time B in the afternoon. In other words, the amount of generated power (from the renewable energy) 41 represents a power generation stop line above which the renewable energy power generation is stopped.

However, the actual power load (demand) 42 varies depending on the actual weather condition (information) and the system voltage, phase, and frequency on the actual day, and may exceed the amount of generated power (from the renewable energy) 41, predicted by the calendar method, as indicated by the solid line in FIG. 4.

In the conventional method, the renewable energy power generation is stopped, and the shortfall in power for the actual power load 42 is covered by thermal power generation and the like.

Also, as indicated by the solid line in FIG. 4, the actual power load 42 is less than the renewable energy generated power 40 without power generation suppression. For this reason, if the renewable energy power generation is simply resumed, part of the renewable energy generated power 40 will be an excess of power.

To address this, in the present invention, the power generation amount setting value is set such that the generated power will be greater than the amount of generated power (from the renewable energy) 41, predicted by the calendar method, but less than the actual power load (demand) 42. As a result, the generated power 43, controlled by the present invention as indicated by the dashed-two dotted line in the figure, is obtained.

Thus, it is not necessary to cover a shortfall in power with thermal power generation and the like. Hence, the present invention is accordingly economical and advantageous in $CO_2$ reduction.

As described above, in the present invention, the renewable energy power generation has a control function based on the instantaneous power. This enables real-time, accurate, and economical power generation without uncertain power generation control (power generation suppression) based on information on calendar prediction, which is indefinite prediction, and also is advantageous in $CO_2$ reduction.

At the same time, renewable energy stably controlled to a certain amount also greatly contributes to stabilization of the system interconnection, which is socially important, as a matter of course.

Moreover, since the instantaneous power of the renewable energy can be freely controlled, stable power management is possible.

Furthermore, when the power grid voltage, phase, and frequency increase due to renewable energy power generation exceeding the power consumption the power grid can tolerate, this problem can be solved by adjusting the amount of power generated (target amount).

As mentioned above, output suppression has been made obligatory by the notice announced on Jan. 22, 2015. In reality, however, there remain many technically unsolved matters including manually changing the parameters and the like of a huge number of power conditioners (PCSs) installed in the field.

The present invention solves these problems by the power instantaneous control based on collective setting (target value and power generation amount setting value).

Further, in the output suppression method in the current technique using prediction based on calendar information, it is inevitable to perform the output suppression even if the weather condition on the actual day is such that the power generation is possible. However, in the present invention, generated power can be guaranteed as much as possible to an extent tolerable in view of the system stability.

Also, by operating the renewable energy power generation installations with the setting value set to be somewhat less than the maximum output (e.g. 80 to 90%), the output will not be changed even when the amount of power generation decreases due to a change in weather condition (amount of insolation) as long as the decrease is within the range of the change by which the setting is lowered. Hence, stable renewable energy power generation will be possible.

The present invention therefore implements power generation equipment in which renewable energy, which has been considered inevitably unstable, is stable, and thus is effective in both system interconnection and $CO_2$ reduction.

Further, in the calendar method described in the section "PROBLEMS TO BE SOLVED BY THE INVENTION", it is inevitable to perform output suppression even if the weather condition on the actual day is such that the power generation is possible. However, in the present invention, generated power can be guaranteed as much as possible to an extent tolerable in view of the system stability.

Meanwhile, under the Electricity Business Act, a chief electricity engineer's presence or the like is obligatory when power generation equipment of a certain scale or larger is started or stopped.

However, even if the information processing unit 10 receives the power generation suppression command 23 based on the calendar information 20, the power generation equipment will not be completely stopped as long as the output power is maintained at a low level (e.g. 10 to 20%). This provides the advantage that the time and effort in witnessing manual operations can be saved and significant labor-saving can be achieved. In other words, when output suppression is eventually cancelled, the power generation can be resumed with an unattended operation.

Embodiment 2

An autonomous stably-supplying type renewable energy control device according to a second embodiment of the present invention is capable of performing simpler control than that in the embodiment illustrated in FIG. 1. Specifically, the power to be generated is controlled in a stepwise manner instead of being proportionally controlled.

Compared to the embodiment illustrated in FIG. 1, power conditioners 14 used in this embodiment are characterized by having an ON-OFF actuation-stop function allowing the power conditioners 14 to be actuated or stopped with an ON or off signal, instead of the proportional-control type power adjusting function.

Also, an output signal unit 7 is characterized in that it outputs an ON or OFF signal, instead of a manipulation amount, to each power conditioner 14 to actuate only power conditioners 14 corresponding in number to a comparison signal adjusted by a control unit 6 while stopping the remaining power conditioners 14.

Also, while 10 solar panels 12 are used in FIG. 1, 20 solar panels 12 are used in this embodiment, and the maximum amount of power generation of each solar panel 12 is 100 kw, that is, the total maximum amount of power generation is 2000 kw.

As in the above-described example, when the instantaneous power detected by an instantaneous power detector 3 is 1900 kw (95%), the standard signal outputted as the instantaneous power from the instantaneous power detector 3 is 19.2 mA, and the standard signal set as the target value by a to-be-generated power setting unit 5 is assumed to be 18.4 mA, which is a voltage of 1800 kw (90%), for example.

A comparison unit 4 calculates the difference of the instantaneous power from the target value and outputs (18.4 mA−19.2 mA)=−0.8 mA as the comparison signal.

As in embodiment 1, the control unit 6 performs various kinds of adjustment that have been conventionally well known in the field of instrumentation based on the comparison signal outputted from the comparison unit 4 such that, in the above example, the instantaneous power detected by the instantaneous power detection unit 3 will be close to the target value set by the target value setting unit 5, in other words, the standard signal as the instantaneous power detected by the instantaneous power detection unit 3 will be close to the target value of 18.4 mA from its current value of 19.2 mA.

Further, the current manipulation amount should be changed by {(18.4 mA−19.2 mA)/(19.2 mA−4 mA)}≅−5.3% in order that 19.2 mA, which is the current value of the standard signal as the instantaneous power detected by the instantaneous power detection unit 3, can be the target value of 18.4 mA, as described above.

However, the power conditioners 14 in this embodiment do not have the proportional-control type power adjusting function.

Instead of the proportional-control type power adjusting function, the power conditioners 14 in this embodiment have the ON-OFF actuation-stop function, which allows them to be actuated or stopped with an ON or off signal.

Thus, the output signal unit 7 outputs an ON or OFF signal, instead of a manipulation amount, to each power conditioner 14 to actuate only power conditioners 14 corresponding in number to the comparison signal while stopping the remaining power conditioners 14.

In this example, the output signal unit 7 continues to output an ON signal to 19 power conditioners 14 while outputting an OFF signal to 1 power conditioners 14.

As a result, the 19 power conditioners 14 continue to be actuated while the 1 power conditioner 14 is stopped. In sum, (1/20)=5% of the amount of power generation is suppressed.

Then, the instantaneous power detected by the instantaneous power detector 3 becomes 1900 kw×(19/20)=1805 kw, which is a standard signal of (1805 kw/2000 kw)×(20 mA−4 mA)+4 mA=18.44 mA. In other words, the standard signal as the instantaneous power detected by the instantaneous power detector 3 becomes close to the standard signal as the target value of 18.4 mA.

In this embodiment, since some of the plurality of power conditioner 14 is stopped by an OFF signal from the output signal unit 7, the amount of power generation is controlled in a stepwise manner according to the number of power conditioners 14. In this embodiment, the amount of power generation is controlled by 20 levels.

The other features of the configuration are similar to those in the previous embodiment and offer similar advantageous effects.

According to this embodiment with the above-described configuration, the comparison signal is adjusted by the control unit 6 and an ON or OFF signal is outputted to each power conditioner 14 instead of a manipulation amount to stop some of the power conditioners 14 so that the instantaneous power detected by the instantaneous power detector 13 will be close to the target value set by the to-be-generated power setting unit 5. In this way, the output power can be adjusted in a stepwise manner. Hence, this embodiment shares similarity with embodiment 1 in that it offers the advantage of being capable of freely controlling power generated from the renewable energy, which has been commonly considered unstable.

Moreover, the power conditioners 14 may only have the ON-OFF actuation-stop function and does not require the proportional-control type power adjusting function. This is advantageous in that widely and generally used power conditioners can be utilized.

INDUSTRIAL APPLICABILITY

The autonomous stably-supplying type renewable energy control device of the present invention is widely industrially applicable.

EXPLANATION OF THE REFERENCE NUMERALS

1 power transmission point
2 voltage-phase-frequency detector
3 instantaneous power detector
4 comparison unit
5 to-be-generated power setting unit
6 control unit
7 output signal unit
8 output signal converter
9 temporary delay converter
11 generated power meter
10 information processing unit
12 solar panel
13 transformer
14 power conditioner (PCS)
15 PCS power outlet
16 low-voltage side power transmission line
17 high-voltage side power transmission line
18 high-voltage side power transmission line
20 calendar information
21 staff such as personnel in charge of electrical safety
22 apparatus such as personal computer
23 power generation suppression command
24 weather information
25 system voltage-phase-frequency information
30 to-be-generated power reporting function
40 renewable energy generated power (without power generation suppression)
41 amount of generated power (from renewable energy) with predicted suppression based on calendar information
42 actual power load (demand)
43 generated power controlled by the present invention 50 electric power company system administrator
100 control system
E electric power company

The invention claimed is:

1. An autonomous stably-supplying type renewable energy control device comprising:
one or more a plurality of power converters connected respectively to one or more a plurality of power generation installations that each generate power from renewable energy,
and having a proportional-control type power adjusting function that converts the power generated by the respective power generation installations from DC power into AC power and outputs the resultant power while adjusting the power to be outputted in proportion to a manipulation amount;
a transformer;
an instantaneous power detector that detects instantaneous power of the power outputted from the power converters;
a voltage-phase-frequency detector;
a generated power meter;
a power transmission point that has interposed in order between it and the plurality of power converters, the transformer, the instantaneous power detector, the voltage phase-frequency detector, and the generated power meter;
a comparison unit that compares the instantaneous power detected by the instantaneous power detector and a target value set by a to-be generated power setting unit and outputs a comparison signal;
a control unit that adjusts the comparison signal outputted by the comparison unit; and
an output signal unit that outputs the comparison signal adjusted by the control unit to the power converters as the manipulation amount, wherein:
the to-be-generated power setting unit sets the target value based on a power generation amount setting value calculated by an information processing unit, and
the information processing unit sets the power generation amount setting value such that the power to be outputted from the power converters is greater than a predicted power load but less than an actual power load when the actual power load is greater than the predicted power load, the predicted power load being a load predicted based on calendar information on a past power demand, the actual power load being a load that varies depending on actual weather information and a system voltage, phase, and frequency on an actual day.

2. The autonomous stably-supplying type renewable energy control device according to claim 1, wherein an instrumentation standard signal is used for the instantaneous power detected by the instantaneous power detector, the target value set by the to-be-generated power setting unit, and the comparison signal outputted by the comparison unit.

3. The autonomous stably-supplying type renewable energy control device according to claim 1, wherein the calendar information is stored on the Web.

* * * * *